US007124681B2

(12) United States Patent
Louviere et al.

(10) Patent No.: US 7,124,681 B2
(45) Date of Patent: Oct. 24, 2006

(54) APPARATUS AND METHOD FOR IMPRINTING A VIAL

(76) Inventors: Kent A. Louviere, 314 School Board Dr., New Iberia, LA (US) 70560; A. Robert Coningsby, III, 3000 NE. 12th Ter., Ft. Lauderdale, FL (US) 33334

( * ) Notice: Subject to any disclaimer, the term of this patent is extended or adjusted under 35 U.S.C. 154(b) by 0 days.

(21) Appl. No.: 10/963,614

(22) Filed: Oct. 13, 2004

(65) Prior Publication Data

US 2005/0115422 A1 Jun. 2, 2005

Related U.S. Application Data

(63) Continuation-in-part of application No. 10/799,968, filed on Mar. 10, 2004, now Pat. No. 7,007,445, which is a continuation of application No. 09/594,528, filed on Jun. 14, 2000, now Pat. No. 6,735,926, which is a continuation-in-part of application No. 09/054,905, filed on Apr. 3, 1998, now Pat. No. 6,101,791.

(51) Int. Cl.
*B41F 17/00* (2006.01)
*B65G 29/00* (2006.01)

(52) U.S. Cl. .......................... 101/37; 101/35; 198/608

(58) Field of Classification Search ................ 198/608, 198/339.1, 345.1, 345.3, 373, 375, 867.09, 198/867.11, 867.12, 803.12; 101/35
See application file for complete search history.

(56) References Cited

U.S. PATENT DOCUMENTS

| | | | | |
|---|---|---|---|---|
| 3,613,571 | A * | 10/1971 | Russell et al. | 101/40 |
| 3,960,073 | A * | 6/1976 | Rush | 101/40 |
| 4,050,412 | A * | 9/1977 | Bautz | 118/642 |
| 4,235,579 | A | 11/1980 | Kurz et al. | |
| 4,588,391 | A * | 5/1986 | Evans et al. | 493/165 |
| 4,840,691 | A | 6/1989 | Knape | |
| 5,284,001 | A * | 2/1994 | Ochs | 53/307 |
| 5,836,618 | A | 11/1998 | Perlman | |
| 5,985,376 | A | 11/1999 | Kamen | |
| RE37,248 | E | 6/2001 | Dudley | |
| 6,584,894 | B1 * | 7/2003 | Mason | 101/35 |
| 6,634,291 | B1 | 10/2003 | Huang | |
| 6,732,642 | B1 | 5/2004 | Huang | |
| 6,739,249 | B1 | 5/2004 | Huang | |
| 6,948,425 | B1 * | 9/2005 | Dumenil | 101/38.1 |
| 2003/0041754 | A1 | 3/2003 | Huang | |
| 2004/0169690 | A1 * | 9/2004 | Morton et al. | 347/4 |

* cited by examiner

*Primary Examiner*—Ren Yan
*Assistant Examiner*—Matthew Marini
(74) *Attorney, Agent, or Firm*—C. Dean Domingue; Robert L. Waddell; Ted M. Anthony

(57) ABSTRACT

An apparatus and method for printing onto vials. The vials are connected in a series, the vials having an open end and a closed end. The apparatus comprises a conveyor belt for moving the vials, the conveyor having a mandrel for receiving the open end of the vials, the mandrel containing a plurality of receiving post, for receiving the vials. The apparatus further includes a vial depressor for depressing the vial onto the receiving post of the mandrel, a first offset inking transfer device for printing a first ink pattern onto the vials, and a first ultra violent dryer positioned to receive the vials from the first offset inking transfer device and provide for drying of the ink pattern from the first offset inking transfer device.

22 Claims, 7 Drawing Sheets

APPARATUS AND METHOD FOR IMPRINTING A VIAL

This application is a continuation in part application of my patent application bearing Ser. No. 10/799,968 filed on 10 Mar. 2004 now U.S. Pat. No. 7,007,445, which is a continuation application from my patent application bearing Ser. No. 09/594,528 filed on 14 Jun. 2000, now U.S. Pat. No. 6,735,926, which is a continuation in part application of my application bearing Ser. No. 09/054,905 filed on 3 Apr. 1998, now U.S. Pat. No. 6,101,791.

BACKGROUND OF THE INVENTION

This invention relates to an apparatus and method for imprinting a vial. More particularly, but not by way of limitation, this invention relates to an offset printing system and method for printing onto a vial.

A method of producing a series of interconnected vials was disclosed in my co-pending continuation-in-part patent application bearing Ser. No. 10/799,968, filed on 10 Mar. 2004 which is incorporated herein by reference. The vials produced by the method and apparatus are interconnected. The vials can be filled with a material. In one preferred embodiment, the vials can be filled with a medicine. The vials can then be heat sealed so that the material is held within a self-contained unit.

Users of the vials will require information of the type of material contained within the container. In the situations wherein the vials contain medicine, certain information such as type of medicine, dosage amount, manufacturer, expiration date, etc. is very important. Additionally, the number of vials filled and the lot from which material originated is also very important. Prior art techniques including printing onto a label, and then placing the label onto the vial. However, this is undesirable for several reasons. First, the placement of the labels onto the vials is a highly inefficient and time consuming. Additionally, the type of ink used must not be toxic or environmentally unsafe since the ink has a possibility of contaminating the material contained within vial, or alternatively, the ink making the outer portion of the vial unsanitary.

Hence, there is a need for an apparatus to imprint onto a vial. There is a further need to imprint onto a series of interconnected vials. Still further, there is a need to imprint a label that is safe to the user and the environment. There is also a need to print onto a plastic article that is irregular in size and shape. These and many other needs will be met by the following invention.

SUMMARY OF THE INVENTION

An apparatus for imprinting vials is disclosed, and wherein the vials are connected in a series. The apparatus comprise a hopper for holding the vials, and a bowl feeder for positioning the vials onto a track. The apparatus further comprises a conveyor belt for moving the vials, with the conveyor having a mandrel for receiving an open end of the vials. The mandrel contains a plurality of receiving post for receiving the vials, and wherein the receiving post are of an oblong cross-sectional area and wherein a base portion of the receiving post has a greater cross-sectional area than a head portion of the receiving post.

The apparatus further comprises a vial depressor for depressing the vial onto the receiving post of the mandrel. A first offset inking transfer device for printing a first ink pattern onto the vials is included along with a first ultra violent dryer positioned to receive the vials from the first offset inking transfer device and provide for drying of the ink pattern from the first offset inking transfer device.

In one embodiment, the vial depressor comprises a first wheel rotatably connected to a second wheel, and wherein the top of the vials will abut a space created between the first wheel and the second wheel. The apparatus may further comprise an air cooler device for cooling the air and directing the cool air onto the vials in order to cool the vials. The apparatus also comprise a vial remover comprising a plate positioned on the underside of the conveyor and down stream of the first ultra dryer so that the vials are removed from the mandrel. The apparatus may also include a photo-eye device, positioned downstream of the bowl feeder, for determining whether the vials are positioned on the conveyor and transmitting a signal in order to halt the conveyor if the vials are improperly positioned on the conveyor.

In one preferred embodiment, a laser engraver is included in order to engrave an alpha numeric number onto the vial. Also, a flame treater means, positioned downstream of the vial depressor so that the vials are heat treated in preparation of the printing of the ink pattern on the vials is also included.

In the preferred embodiment, a second offset inking transfer device for printing a second ink pattern onto the vials is included along with a second ultra violent dryer positioned to receive the vials and provide for drying of the ink pattern from the second offset ink transfer device.

A method of imprinting a series of interconnected vials is also disclosed. The method comprises providing the series of interconnected vials onto a track, and placing the vials onto a mandrel having a plurality of receiving post, for receiving the vials. The receiving post are of oblong cross-sectional area and have a base portion that has a greater cross-sectional area than a head portion of the receiving post.

The method further includes depressing the vials onto the mandrel with a vial depressor for depressing the vial onto the receiving post of the mandrel. Next, the vials are imprinted with a first offset inking transfer device, and the ink is cured with a first ultra violent dryer. The method further includes printing onto the vials with a second offset inking transfer device, curing the ink with a second dryer, and removing the vials with a vial remover. In one preferred embodiment, the vial remover comprises a plate positioned on the underside of the conveyor and down stream of the first dryer so that the vials are removed from the mandrel. The method may further include cooling the vials.

In one preferred embodiment, the vial depressor comprises a first wheel rotatably connected to a second wheel, and wherein the top of the vials will abut a space created between the first wheel and the second wheel, and the step of depressing the vials includes abutting the first and the second wheel against a top portion of the vials so that the vials are captured on the mandrels.

An advantage of the present invention includes use of an offset inking transfer device which is a fast and efficient technique for printing onto plastic vials. Another advantage is that the process herein described allows for mass labeling production i.e. significant production quantity in a minor amount of time.

Yet another advantage is that the labels are treated with ultra violent dryer so that toxins are eliminated from the surface of the vials. Another advantage is that the vials, with printed labels, can be used for medical purposes. For instance, a liquid medicine can be placed within the vials, and the vials can be sealed. Then, the user can twist the top of the vial and open the vial. This can all be done since the ink of the printed material has been properly cured. Another advantage is that the ultra violent dryers make the ink impermeable in the plastic which is important health and safety issue.

A feature of the invention is that a conveyor belt is used to transporting the vials for printing and treating. Another feature is that a specially designed mandrel carries the vials on the conveyor. Still another feature is the design of the mandrel in conjunction with the vial depressor captures the vial on the mandrel for printing.

Yet another feature is the ultra violent light that cures the ink after printing. Another feature is the laser engraver that engraves the vials with various pertinent information. Another feature is the use of an air cooler for cooling the vials after the printing. Still yet another feature is that in preferred embodiment, multiple printing stations are provided. Yet another feature is the flame treater prepares the plastic for imprinting. Still yet another feature is the photoeye confirms the proper placement of the vials on the mandrel.

DETAILED DESCRIPTION OF THE PREFERRED EMBODIMENTS

Figure 1:
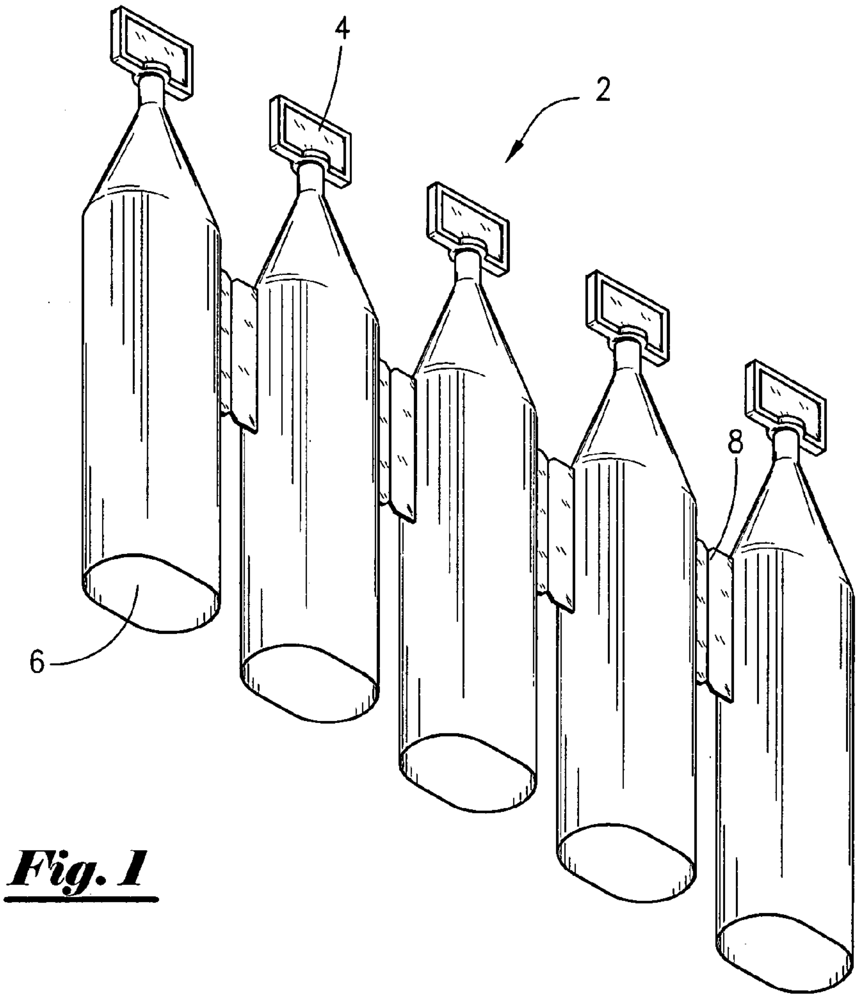
FIG. 1 is an isometric view of a preferred embodiment of the vial string of the present invention.

Referring now to FIG. 1, an isometric view of a preferred embodiment of the vial string 2 of the present invention will now be described. This application is a continuation in part application of my patent application bearing Ser. No. 10/799,968 filed on 10 Mar. 2004, which is a continuation application from my patent application bearing Ser. No. 09/594,528 filed on 14 Jun. 2000, now U.S. Pat. No. 6,735,926, which is a continuation in part application of my application bearing Ser. No. 09/954,905 filed on 3 Apr. 1998, now U.S. Pat. No. 6,101,791, and wherein the co-pending application Ser. No. 10/799,968 is incorporated herein by express reference. Additionally, U.S. Design Patent D460, 175 is also incorporated herein by express reference. As per the teachings of these references, a vial string 2 is produced, and wherein the vial string 2, in one preferred embodiment, contains a string of five (5) interconnected vials.

The vials have a closed top portion 4 and an open bottom portion 6. After production of the vial string 2, the bottom portion 6 is generally an oblong shaped opening, and as per the teachings of this invention, the bottom portion can be filled with a material, such as a medicine, and thereafter, the bottom portion 6 can be heat sealed to form a closed container. In order to use the material, such as liquid medicine, within the vial, the user would simply twist the top portion 4 thereby opening the vial to the contents therein.

FIG. 1 shows five (5) vials interconnected. It should be understood that the present invention is applicable to an individual vial to a string that contains over a dozen interconnected vials. The vials are interconnected via the interconnecting arms 8. The vials are constructed of a plastic, and in one preferred embodiment, the plastic can be purchased from Dow Chemical Company under the trade name Metallocene Resin PT 1450.

Figure 2:
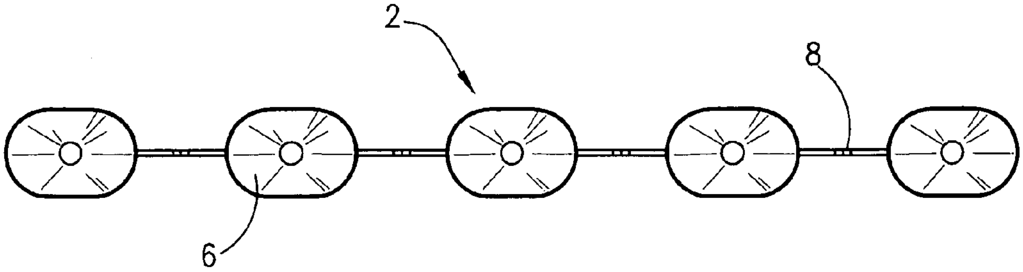
FIG. 2 is a top view of the vial string seen in FIG. 1.

Referring now to FIG. 2, a top view of the vial string 2 seen in FIG. 1 will now be described. The view of FIG. 2 depicts the oblong shape opening of the bottom portion 6. It should be noted that the invention herein described is also applicable to vials that have other shaped openings; however, the shape of the body of the vials will need to be matched by the body of the mandrel.

Figure 3:
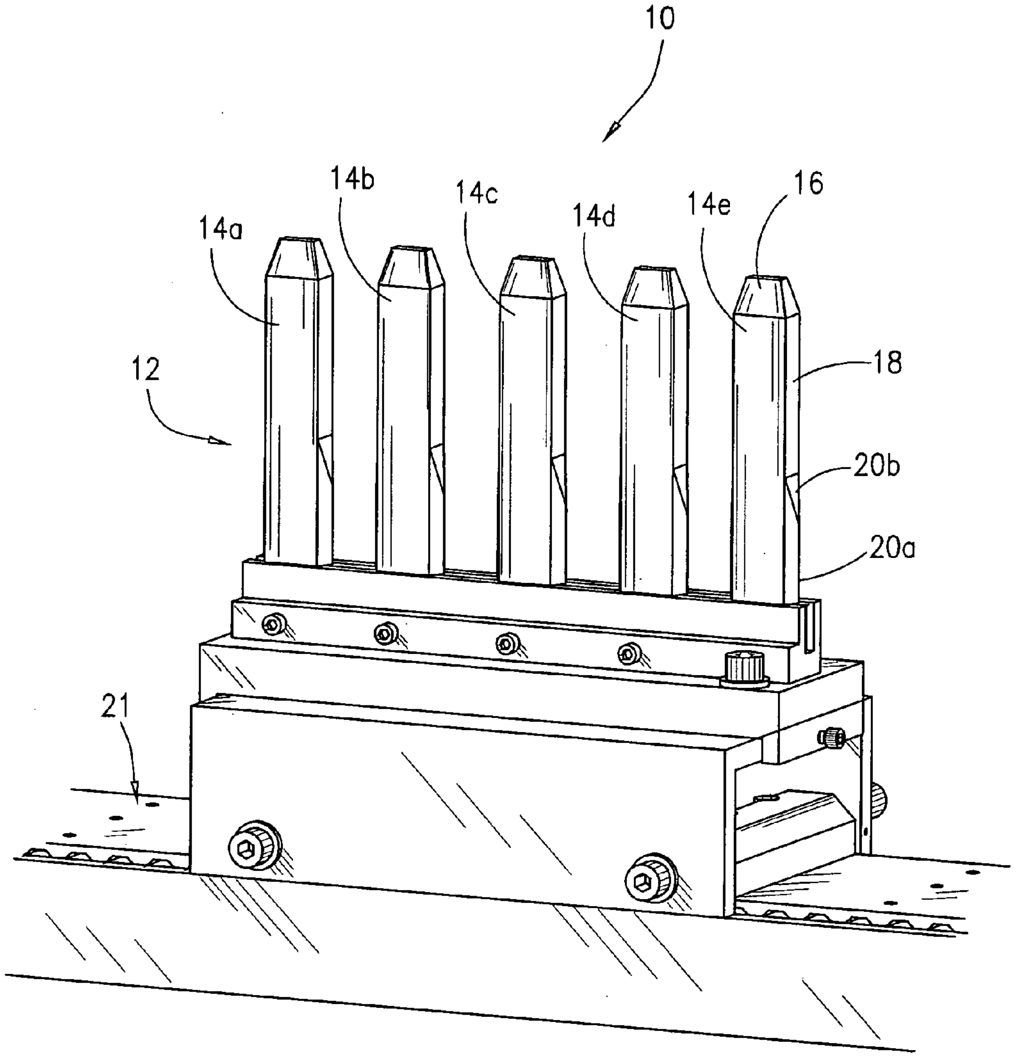
FIG. 3 is an isometric view of a preferred embodiment of the mandrel with receiver post used in this invention.

Thus, in FIG. 3, which is an isometric view of a preferred embodiment of the mandrel 10, the receiver post will be configured so that the vial string 2 fits thereon. As seen in FIG. 3, the mandrel 10 consists of a plurality of receiver post 14*a*, 14*b*, 14*c*, 14*d*, 14*e*. The receiver post have a pointy top portion 16 that extends to an elongated body 18 which in turn extends to an expanded bottom portion 20 (sometimes referred to as the bottom flare 20). The expanded bottom portion 20 is generally in the shape of the bottom portion 6 of the vial, which in the preferred embodiment will be an oblong shape seen in FIG. 2. Returning to FIG. 3, once the vials 2 are placed onto the mandrel 10, the inner part of the bottom portion 6 of the vials will abut the outer part of the expanded bottom portion 20 of the receiver post, as will be further described later in the application.

Figure 4:
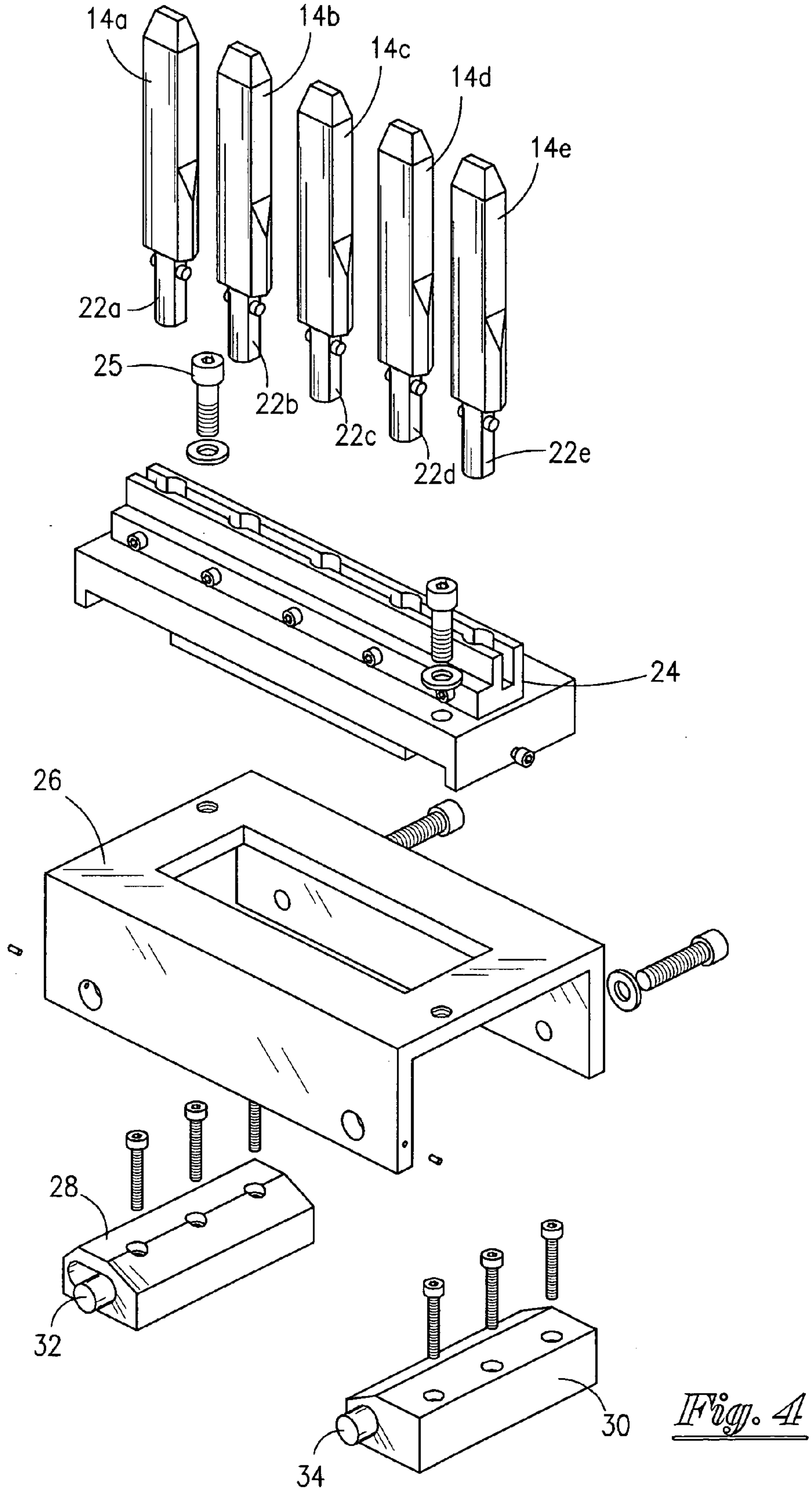
FIG. 4 is an exploded view of the mandrel and receiver post seen in FIG. 3.

FIG. 4 is an exploded view of the mandrel 10 and receiver post 14*a*–14*e* seen in FIG. 3. As shown, the receiver post 14*a*–14*e* contain a leg extensions 22*a*, 22*b*, 22*c*, 22*d*, 22*e*, and wherein the mandrel 10 contains a fastener sleeve 24. As seen in FIG. 4, the leg extension 22 will fit into the fastener sleeve 24, and wherein the leg extensions will be attached to the fastener sleeve 24 via fastener means such as nuts and bolts, such as the bolt 25. The fastener sleeve 24 will be attached to a shell 26 via conventional means, and the shell 26 will in turn be attached to the drive blocks 28, 30. The drive blocks 28, 30 will have the pallet shafts 32, 34 disposed there through, and wherein the blocks 28, 30 will be attached to the conveyor belt so that the mandrel 10 can be transported.

Figure 5:
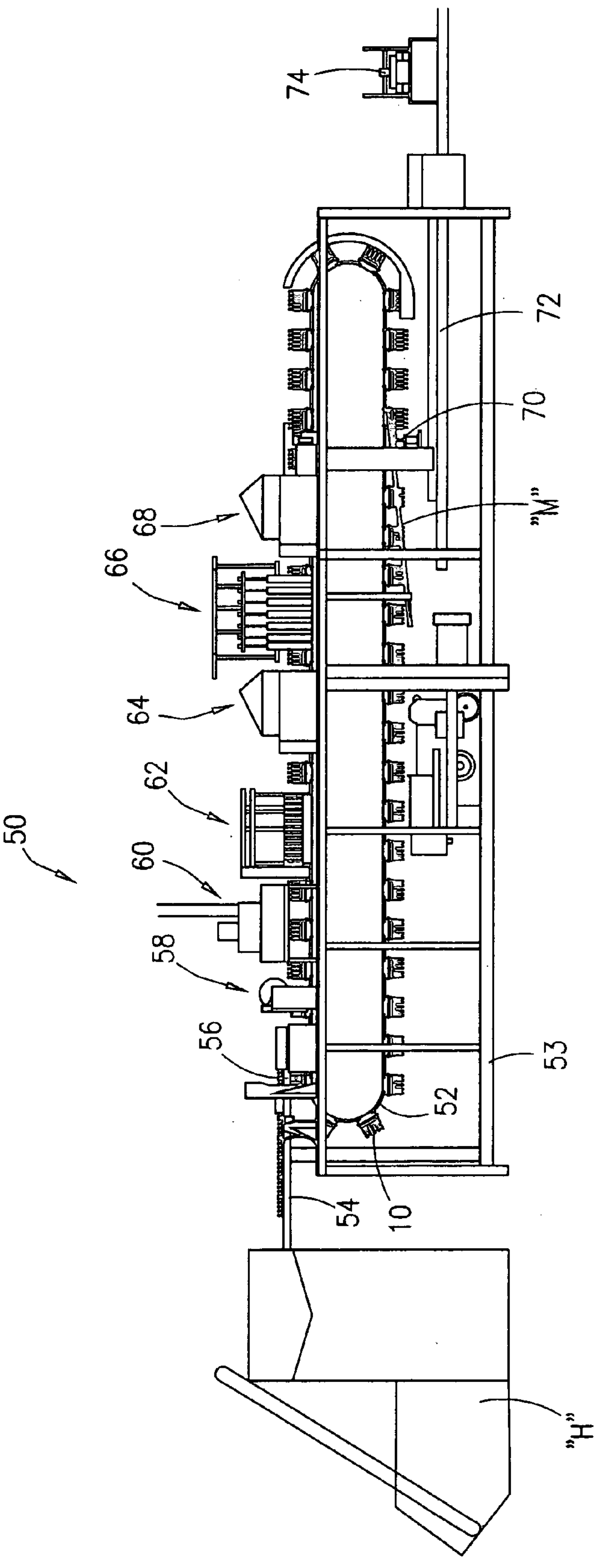
FIG. 5 is a perspective view of the most preferred embodiment of the printing system herein disclosed.

Referring now to FIG. 5, a perspective view of the most preferred embodiment of the printing system 50 will now be described. The system 50 includes the conveyor belt 52, and wherein a plurality of mandrels are operatively attached to the conveyor belt. For instance, mandrel 10 is shown attached on the conveyor belt 52. Approximately fifty (50) mandrels are shown attached to the conveyor belt 52 in FIG. 5. The conveyor belt 52 is mounted on a support table 53. As noted earlier, a string of vials consist of five (5) vials. A plurality of vial strings will be fed from a hopper "H" to the in-feed mechanism 54, and wherein the in-feed mechanism 54 aligns the string of vials onto a track 56. The in-feed mechanism 54 will be described in greater detail later in the application.

From the track 56, the vial strings will dropped onto the mandrels. A vial depressor 58 will act to depress and capture the vial string onto the mandrel. The vial depressor 58 contains a wheel means that lowers onto the top of the vial string thereby lowering the vial string onto the mandrel, as will be described in further detail later in the application. After the string of vials are placed onto the mandrel, the conveyor will transport the vial string to a flame treater means 60 for heating the surface of the vials in preparation for the offset printing process. A flame treater means 60 is commercially available from Apex Machine Company under the name Flame Treater.

After the string of vials has been heat treated, the conveyor belt 52 will transport the vial string to the first offset inking transfer device 62 (sometimes referred to as the first printing station 62), wherein the offset inking transfer device 62 is commercially available from Apex Machine Company. The first printing station 62 may print a base coat and other preliminary images. Next, the conveyor belt 52 will transport the vial string to the ultra violent dryer means 64 for drying of the ink pattern from the first printing station 62. The ultra violent dryer means 64 is commercially available from Apex Machine Company.

The conveyor belt 52 will then transport the vial string to the second offset inking transfer device 66 (sometimes referred to as the second printing station 66), wherein the offset inking transfer devices 62, 66 are commercially available from Apex Machine Company. The second printing station 66 may print a pattern and alphanumeric information beneficial to end users of the vials. Next, the conveyor belt 52 will transport the vial string to the ultra violent dryer means 68 for drying of the ink pattern from the second printing station 66. The ultra violent dryer means 64, 68 are commercially available from Apex Machine Company.

The conveyor belt 52 will then loop around on the underside of the support table 53. A means for removing the vials from the mandrels is provided. More specifically, once the conveyor belt 52 loops onto the under side of support table 53, a removal plate 70 is provided, and wherein the removal plate 70 will wedge between the mandrel and the vial. As shown in FIG. 5, the plate 70 is set off at an angle (as seen by angled member "M"); therefore, as the conveyor belt 52 continues its loop about the table 53, the plate 70 will act to remove the vial string from the mandrel. The vial strings will then fall onto the transporter 72, and wherein the transporter 72 is also a conveyor belt assembly. An air cooler device 74 is operatively associated with the transporter 72, and wherein the air cooler device cools the air and directs the cool air onto the vials. In this way, the ink is cooled, thereby preventing sticking of the vial string together which could result in harming the print pattern, or disrupting the packaging process.

Figure 6:
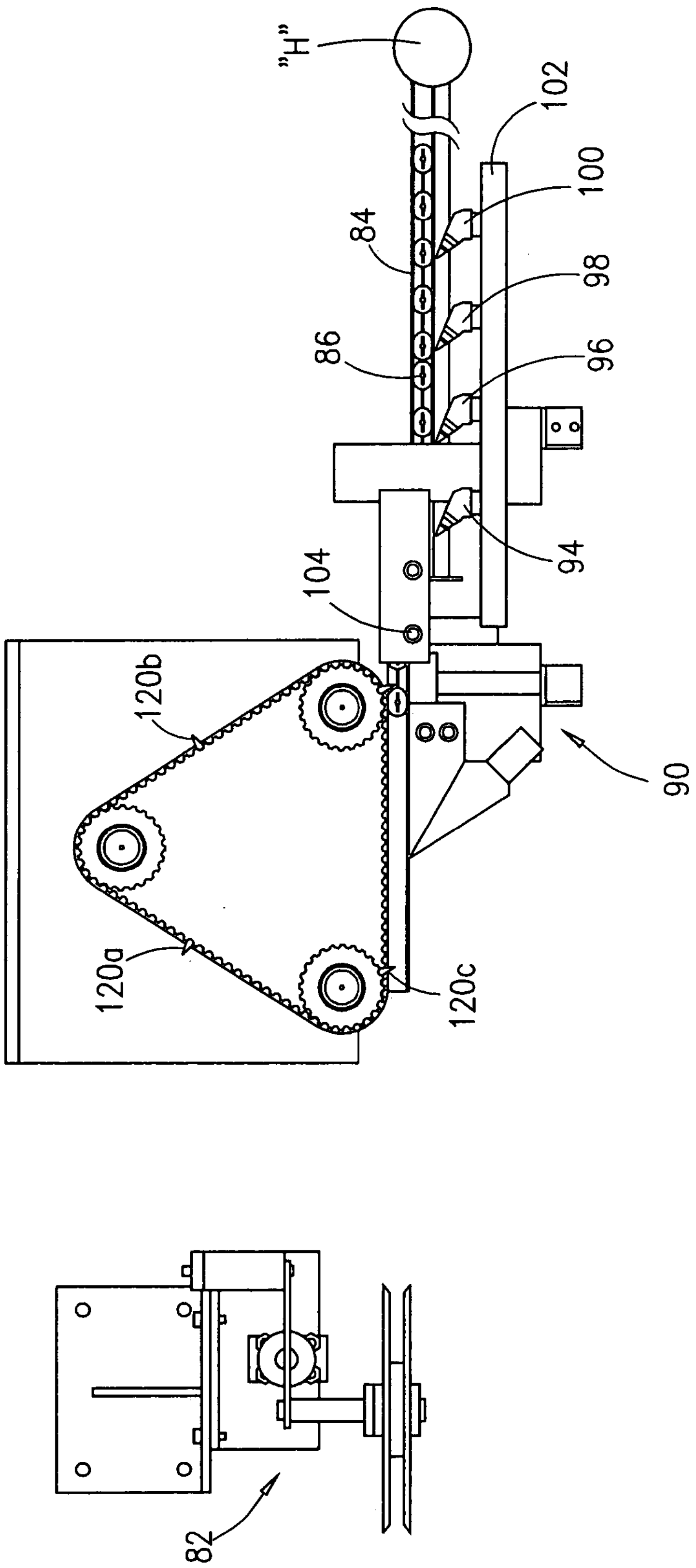
FIG. 6 is a top view of a preferred embodiment of the in-line feed assembly and the vial depressor used in this invention.

Referring now to FIG. 6, a top view of a preferred embodiment of the in-line feed assembly 80 and the vial depressor 82 will now be described. The in-line feed assembly 80 includes the track 84 that will contain the array of vials, seen generally at 86. The array of vials 86 consist of lined up string of vials, and wherein the string of vials comprises five (5) individual vials, as noted earlier. The hopper "H" will deliver the string of vials to the track 84. The track 84 is a conveyor means, and the array of vials is transported to the realignment means 90 for pushing a string of vials off of the track 84 and onto the mandrel, and wherein the mandrel is similar in construction and purpose as mandrel 10 previously discussed.

The means for transporting the array of vials on track 84 is use of a plurality of air jet nozzles 94, 96, 98, 100, and wherein air is delivered to the jet nozzles via conduit 102. Hence, the air pressure produced by the jet nozzles causes the array of vials to advance. The jet nozzles will be energized intermittently, and wherein the timing of the air supply is by the photo-eye sensor means for determining whether the vials are positioned on the conveyor and transmitting a signal in order to halt the conveyor if the vials are improperly positioned on the conveyor.

Figure 7:
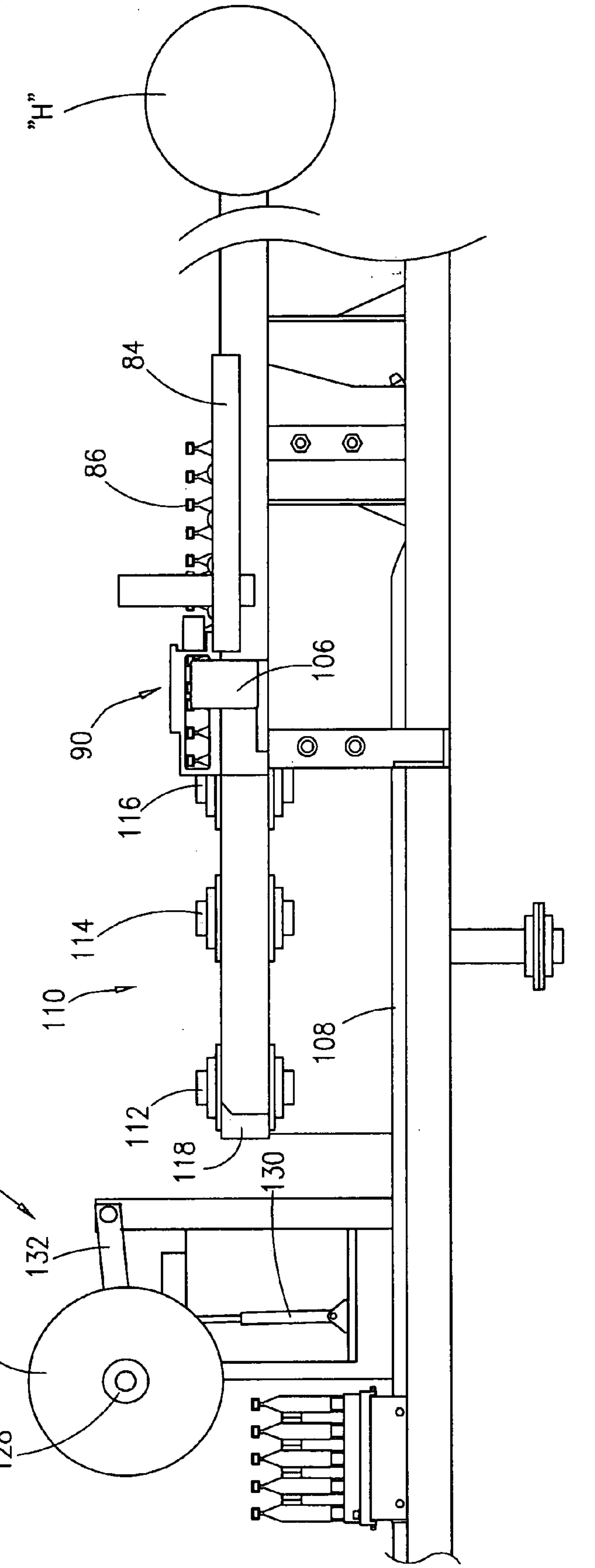
FIG. 7 is a side view of the in-line feed assembly and the vial depressor seen in FIG. 6.

Referring now to FIG. 7, a side view of the in-line feed assembly 80 and the vial depressor 82 seen in FIG. 6 will now be described. The realignment means 90 consist of a piston 106 that will extend outward so that the vial string on the track 84 will be directed to a second track 108, and wherein the second track 108 will then direct the vial string onto the mandrel. As seen in FIG. 6, a belt transporter 110 is provided for moving the vial strings to the mandrels. More specially, the belt transporter 110 in the most preferred embodiment comprises a first pulley 112, a second pulley 114, and a third pulley 116, and the belt 118, which is wrapped about the three gears. The belt 118 will have notches 120*a*, 120*b*, 120*c*, 120*d*, 120*e*, and wherein the notches are spaced at a distance equal to the length of the vial string. In this way, each notch will engage with an individual vial string. As the gears rotate, the belt 118 will also rotate which in turn will allow for the advancement of the vial string along the track 108. From the belt transporter 110, the vial strings will drop from the second track 108 to the mandrel 92. As noted earlier, the mandrel 92 is operatively attached to the conveyor belt 52 of the printing system 50.

FIG. 6 further shows the vial depressor 82. The vial depressor 82 consist of a first wheel 122 and the second wheel 124. The two wheels are attached via shaft 126 and the bushing 128. In the most preferred embodiment, the wheels 122, 124 can each independently rotate. The shaft 126 is attached to a tamper hydraulic cylinder 130 via the tamper arm 132. The hydraulic cylinder will extend a piston (not shown in this figure) that will raise and lower arm 132, which in turn will raiser and lower the wheels 124 and 128. The wheels 122, 124, in the most preferred embodiment, are constructed of a hard plastic.

Hence, the conveyor belt transports the mandrel 92 through the process of printing to the vials and curing the ink on the vials, and then removing the vials from the mandrels, as previously described.

As shown in FIG. 7, the array of vials 86 are positioned within the track 84. As noted earlier, the array of vials 86 consist of aligned strings of interconnected vials. The string of vials fed onto the track are obtained from the hopper H. The air jet nozzles 94–100 move the vial strings along the track 84, and wherein the commands for energizing the air pressure to the nozzles 94–100 is controlled via the photo-eye sensor means 104, as previously discussed.

Figure 8:
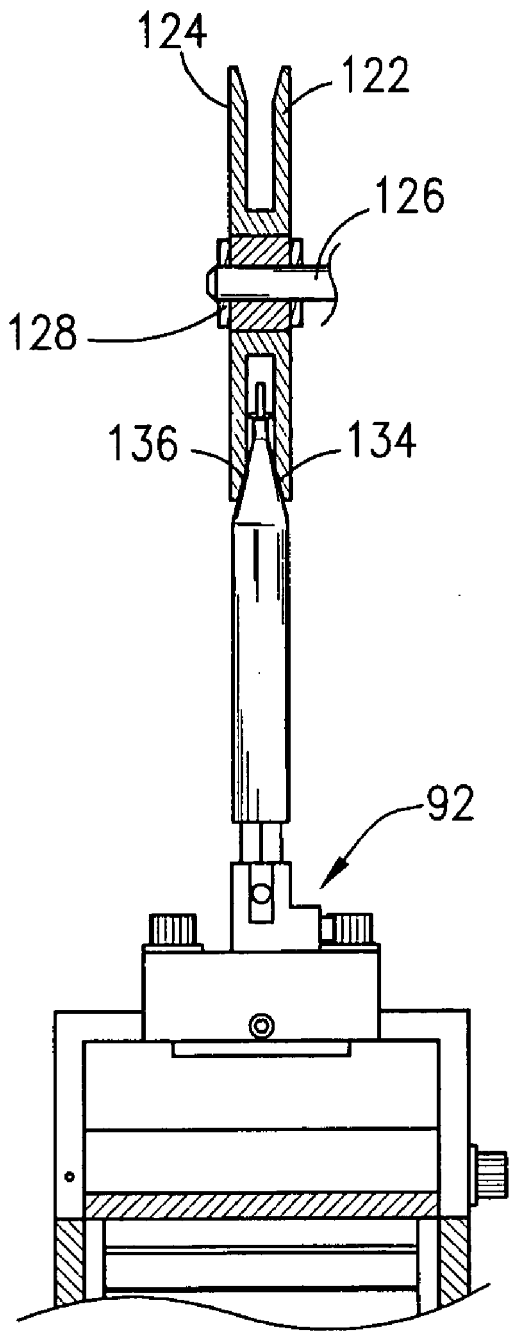
FIG. 8 is a partial front view of the vial depressor with the wheels depressing the vial string onto the mandrel.

Once the vial string is properly positioned, the piston 106 will extend and push the vial string onto the second track 108. Next, the belt transporter 110, and in particular the belt 118 will engage with the vial string via a notch (such as notch 120*a*) on the belt 118. The vial string will be dropped onto the mandrel, and in particular, onto the post of the mandrel. The track will advance the mandrel through the vial depressor 82. The vial depressor 82 will also raise and lower in synchronicity with the mandrel movement on the conveyor belt 52. In FIG. 8, a partial front view of the vial depressor 82 shows the wheels 122, 124 depressing the vial string onto the mandrel 92.

As shown, the chamferred surfaces 134, 136 will abut the top portion of the vial string thereby depressing the vial string onto the mandrel. More specifically, due to the flared bottom portion of the receiving post, the vial string will fit snugly so that the vial string is captured on the mandrel. Once the mandrel 92 is past the vial depressor 82, the wheels 122, 124 will lift via hydraulic cylinder 130. When the next mandrel is in the proper position, the vial depressor 82, and in particular the hydraulic cylinder 130 will cause the wheels 122, 124 to lower and another vial string can be captured on the mandrel.

As noted earlier, the vial remover means for removing the vials from the mandrel is also disclosed, and wherein the vial remover means is for ejecting the vials from the mandrel after the printing process is completed. The vial string is separated from the member "M" seen in 5.

We claim:

1. An apparatus for printing onto vials, and wherein said vials are connected in a series, the vials having an open end and a closed end, the apparatus comprising:

a conveyor belt for moving the vials, said conveyor having a mandrel for receiving the open end of the vials, said mandrel containing a plurality of receiving posts, for receiving the vials, wherein said receiving post comprise an oblong cross-sectional area and wherein a base portion of each receiving post has a greater cross-sectional area than a head portion of each receiving post;

a vial depressor for depressing the vials onto the receiving posts of the mandrel, wherein the vial depressor comprises: a first wheel rotatably connected to a second wheel, and wherein a top portion of the vials will abut a space created between the first wheel and the second wheel;

a first offset inking transfer device for printing a first ink pattern onto the vials;

a first ultra violet dryer positioned to receive the vials from the first offset inking transfer device and provide for drying of the ink pattern from the first offset inking transfer device;

a second offset inking transfer device for printing a second ink pattern onto the vials;

a second ultra violet dryer positioned to receive the vials and provide for drying of the ink pattern from the second offset ink transfer device.

2. The apparatus of claim 1 further comprising:

a vial remover comprising a plate positioned on the underside of the conveyor and down stream of the first ultra violet dryer so that the vials are removed from the mandrel.

3. The apparatus of claim 2 further comprising an air cooler device for cooling the air and directing the cool air onto the vials in order to cool the vials.

4. The apparatus of claim 3 further comprising a photo-eye device, positioned downstream of a bowl feeder, for determining whether the vials are positioned on the conveyor and transmitting a signal in order to halt the conveyor if the vials are improperly positioned on the conveyor.

5. The apparatus of claim 4 further comprising a laser engraver in order to engrave an alpha numeric number onto the vial.

6. The apparatus of claim 5 further comprising a flame treater means, positioned downstream of the vial depressor so that the vial is heat treated in preparation of the printing the ink pattern on the vial.

7. An apparatus for imprinting vials, and wherein said vials are connected in a series, the apparatus comprising:

a hopper for holding the vials, and wherein the vials have an open end and a closed end;

a bowl feeder for positioning the vials onto a track;

a conveyor belt for moving the vials, said conveyor having a mandrel for receiving the open end of the vials, said mandrel containing a plurality of receiving posts, for receiving the vials, wherein said receiving posts are of oblong cross-sectional area and wherein a base portion of each receiving post has a greater cross-sectional area than a head portion of each receiving post;

a vial depressor for depressing the vial onto the receiving posts of the mandrel;

wherein the vial depressor comprises: a first wheel rotatably connected to a second wheel, and wherein a top of the vials will abut a space created between the first wheel and the second wheel;

a first offset inking transfer device for printing a first ink pattern onto the vials;

a first ultra violet dryer positioned to receive the vials from the first offset inking transfer device and provide for drying of the ink pattern from the first offset inking transfer device.

8. The apparatus of claim 7 further comprising an air cooler device for cooling the air and directing the cool air onto the vials in order to cool the vials.

9. The apparatus of claim 8 further comprising:

a vial remover comprising a plate positioned on the underside of the conveyor and down stream of the first ultra dryer so that the vials are removed from the mandrel.

10. The apparatus of claim 9 further comprising a photo-eye device, positioned downstream of the bowl feeder, for determining whether the vials are positioned on the conveyor and transmitting a signal in order to halt the conveyor if the vials are improperly positioned on the conveyor.

11. The apparatus of claim 10 further comprising a laser engraver in order to engrave an alpha numeric number onto the vial.

12. The apparatus of claim 11 further comprising a flame treater means, positioned downstream of the vial depressor so that the vials are heat treated in preparation of the printing of the ink pattern on the vials.

13. The apparatus of claim 12 further comprising:

a second offset inking transfer device for printing a second ink pattern onto the vials;

a second ultra violet dryer positioned to receive the vials and provide for drying of the ink pattern from the second offset ink transfer device.

14. A method of imprinting a series of interconnected vials comprising:

providing the series of interconnected vials onto a track;

placing the vials onto a mandrel having a plurality of receiving posts, for receiving the vials, wherein said receiving posts are of oblong cross-sectional area and wherein a base portion of each receiving post has a greater cross-sectional area than a head portion of each receiving post;

depressing the vials onto the mandrel with a vial depressor for depressing the vial onto the receiving post of the mandrel, wherein said vial depressor comprises: a first wheel rotatably connected to a second wheel, and wherein a top of the vials will abut a space created between the first wheel and the second wheel, and the step of depressing the vials includes: abutting the first wheel and the second wheel against said top portion of the vials so that the vials are captured on the mandrels;

printing onto the vial with a first offset inking transfer device;

curing the ink with a first ultra violet dryer;

printing onto the vials with a second offset inking transfer device;

curing the ink with a second ultra violet dryer;

removing the vials with a vial remover comprising a plate positioned on the underside of a conveyor and down stream of the first ultra violet dryer so that the vials are removed from the mandrel.

15. The method of claim 14 further comprising:

cooling the vials.

16. An apparatus for printing onto vials, and wherein said vials are connected in a series, wherein the vials have an open end and a closed end, the apparatus comprising:

a hopper for holding the vials, wherein the vials have said open end said closed end;

a conveyor belt for moving the vials, said conveyor having a mandrel for receiving the open end of the vials, said mandrel containing a plurality of receiving posts, for receiving the vials, wherein said receiving posts are of oblong cross-sectional area and wherein a base portion of each receiving post has a greater cross-sectional area than a head portion of each receiving post;

a vial depressor for depressing the vial onto the receiving post of the mandrel, wherein the vial depressor comprises: a first wheel rotatably connected to a second wheel, and wherein a top of the vials will abut a space created between the first wheel and the second wheel;

a first offset inking transfer device for printing a first ink pattern onto the vials;

a first ultra violet dryer positioned to receive the vials from the first offset inking transfer device and provide for drying of the ink pattern from the first offset inking transfer device.

17. The apparatus of claim 16 further comprising a flame treater means, positioned downstream of the vial depressor so that the vial is heat treated in preparation of the printing the ink pattern on the vial.

18. The apparatus of claim 17 further comprising an air cooler device for cooling the air and directing the cool air onto the vials in order to cool the vials.

19. The apparatus of claim 18 further comprising:

a vial remover comprising a plate positioned on the underside of the conveyor and down stream of the first ultra dryer so that the vials are removed from the mandrel.

20. The apparatus of claim 19 further comprising a photo-eye device, positioned downstream of a bowl feeder, for determining whether the vials are positioned on the conveyor and transmitting a signal in order to halt the conveyor if the vials are improperly positioned on the conveyor.

21. The apparatus of claim 20 further comprising a laser engraver in order to engrave an alpha numeric number onto the vial.

22. The apparatus of claim 21 further comprising:

a second offset inking transfer device for printing a second ink pattern onto the vials;

a second ultra violet dryer positioned to receive the vials and provide for drying of the ink pattern from the second offset ink transfer device.

* * * * *